Sept. 22, 1925.
E. G. McCAULEY
1,554,222
ANTIGLARE VISUALIZER
Filed May 29, 1923
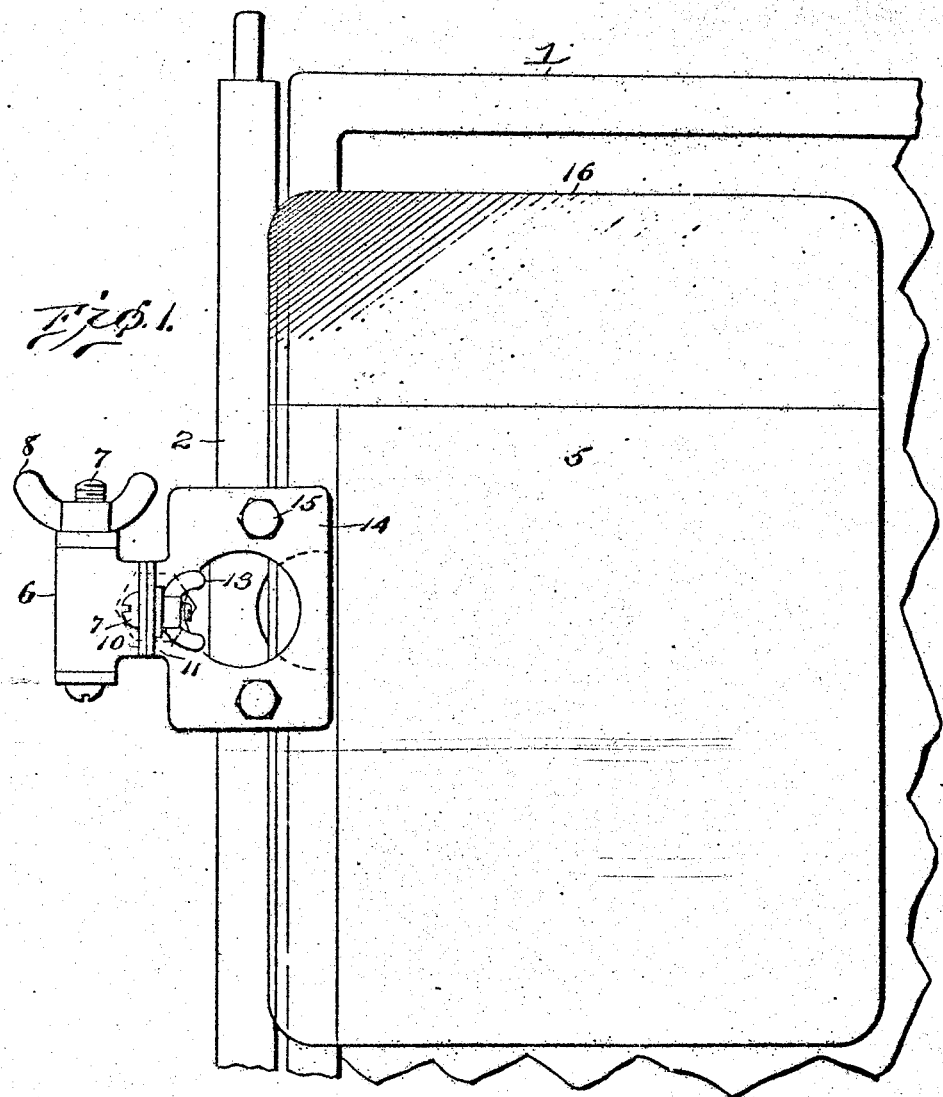
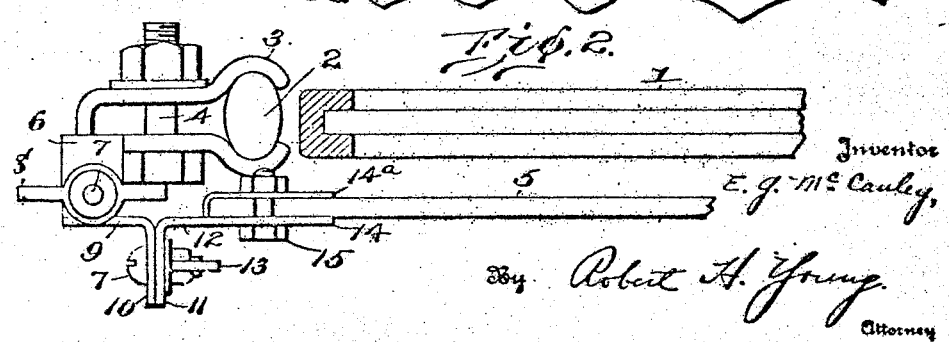
Inventor
E. G. McCauley,
By Robert H. Young.
Attorney Patented Sept. 22, 1925.

1,554,222

UNITED STATES PATENT OFFICE.

ERNEST G. McCAULEY, OF DAYTON, OHIO.

ANTIGLARE VISUALIZER.

Application filed May 29, 1923. Serial No. 642,223.

To all whom it may concern:

Be it known that I, ERNEST G. MCCAULEY, a citizen of the United States, residing at Dayton, in the county of Montgomery and State of Ohio, have invented certain new and useful Improvements in Antiglare Visualizers, of which the following is a specification.

This invention relates in general to windshield attachments for motor vehicles and the like and more particularly to an attachment for windshields which combine the several features of an additional windshield flare surface, a visualizer or anti-glare device, a mirror for looking to the rear, and a device for reflecting headlight glares.

The difficulty in operating motor vehicles in the face of the glare of approaching motor vehicles is well known. It is an object of my invention to provide as an attachment to a windshield an auxiliary device comprising principally a sheet of colored glass, celluloid or the like which can be readily moved to such a position as to cut off the blinding glare of such approaching headlights.

It is further the object of my invention to adapt my attachment to act as an auxiliary windshield or wind flare when not in use for the aforenamed purpose.

It is a further object of my invention to provide an attachment with a reflecting surface such as will act as a mirror for viewing objects to the rear of the vehicle when my attachment is used as a wind flare and as a reflector when my device is used as a visualizer.

Figure 1 is a front elevation of my device, the outward position of the visualizer being illustrated in dotted lines.

Figure 2 is plan view of the structure shown in Figure 1.

Referring with greater particularity to the drawings, it will be seen that 1 represents a portion of an ordinary standard type of motor vehicle windshield which is mounted on the usual standard 2.

The wind flare 5 is adapted to be secured to the standard by means of a suitable clamp 3 provided with adjusting means 4. The clamp 3 has a portion 6 adapted to receive an adjusting screw 7 provided with a wing nut 8. A bracket 9 is adapted to be mounted on the screw 7. This bracket is provided with a flanged portion 10 adapted to be secured to the flanged portion 11 of a clamp plate 12 by means of a suitable adjusting screw and wing nut 13.

The clamp plate 12 is provided with two clamp plate portions 14 and 14ª and with suitable securing means 15 for rigidly holding the wind flare 5. The wind flare 5 is composed of colored glass, celluloid, or some other suitable material which will permit of the necessary degree of visibility for the successful operation of the vehicle while at the same time cutting out the blinding glare of the headlights of an approaching vehicle. Near its upper portion the wind flare is provided with a reflecting surface 16 which operates as a mirror providing for vision to the rear when the wind flare is in its outward position and which operates as a reflector to reflect the glare of the headlights of an approaching vehicle to warn its operator to dim his headlights.

From the foregoing description it will be seen that my wind flare can be adjusted to any desired position around its vertical axis by means of the adjusting screw 7 and wing nut 8, while it may be adjusted around its horizontal axis to conform to the angle of the main windshield by means of the adjusting screw and wing nut 13.

I claim:

In an attachment for a windshield of motor vehicles, a wind flare, means for mounting said wind flare to permit adjustment of the same about its vertical and horizontal axes, said flare consisting of a sheet of translucent material having a reflecting surface across the entire width of the same and along the uppermost end thereof.

In testimony whereof I affix my signature.

ERNEST G. McCAULEY.